United States Patent

[11] 3,583,216

| [72] | Inventor | Victor Milewski |
| | | Birmingham, Mich. |
| [21] | Appl. No. | 770,523 |
| [22] | Filed | Oct. 25, 1968 |
| [45] | Patented | June 8, 1971 |
| [73] | Assignee | The Valeron Corporation |

[54] SURFACE FINISH ANALYZER
2 Claims, 6 Drawing Figs.

[52] U.S. Cl. ................................................ 73/105, 33/169, 73/150
[51] Int. Cl. ........................................ G01b 5/28, G01b 19/08, G01b 3/22
[50] Field of Search .......................................... 73/105, 104, 150, 78; 356/237; 33/169, (Inquired)

[56] References Cited
UNITED STATES PATENTS

| 2,130,269 | 9/1938 | Dietant .................... | 73/150 |
| 2,839,109 | 6/1958 | Wilson et al. ............ | 145/5 |
| 2,373,200 | 4/1945 | Simmons et al. ......... | 73/150 |
| 3,423,837 | 1/1969 | Euverand .................. | 33/169 |

Primary Examiner—Richard C. Queisser
Assistant Examiner—Ellis J. Koch
Attorney—Farley, Forster and Farley ABSTRACT: A means and method for checking a machined surface finish relative to a prescribed standard which includes scratching the surface finish across the lay of the finish to a depth not exceeding the valley depressions for such standard and visually inspecting the scratch line for interruptions indicating a surface finish of less than the desired standards.

PATENTED JUN 8 1971 3,583,216
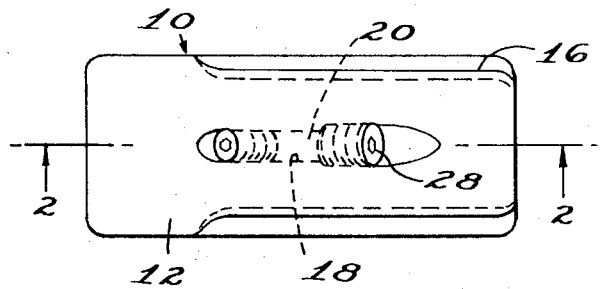
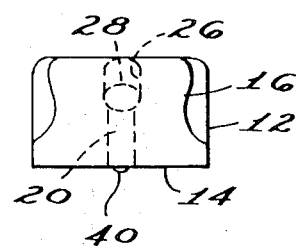
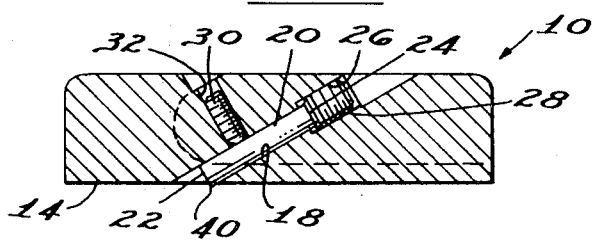
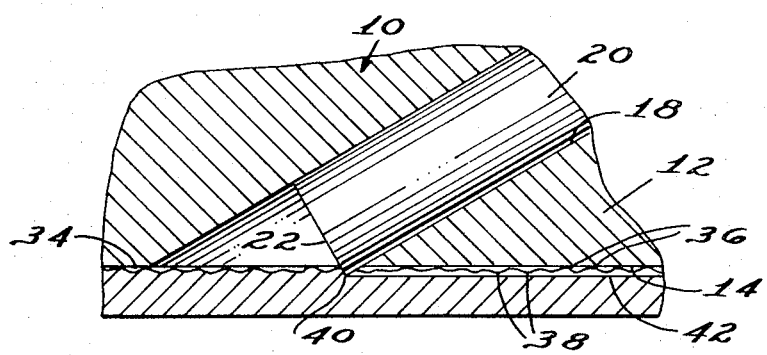
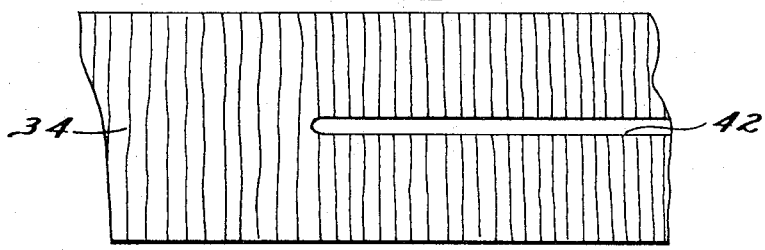
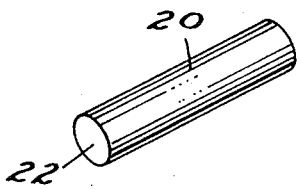
INVENTOR
VICTOR MILEWSKI
BY
Foley, Foster & Foley
ATTORNEYS

SURFACE FINISH ANALYZER

BACKGROUND OF THE INVENTION

In metalworking, it is important to be able to measure a surface finish with reasonable accuracy to assure consistency and meet specified standards, in machining work surfaces, where close tolerance dimensioning is necessary, and where appearance is important.

Laboratories and research facilities use profilometers and brush-type analyzers with a highly sensitive stylus, including a diamond or sapphire contact point, that is displaced as it passes over the lay of a surface finish and will give a meter reading calculation of the means surface, by using the peaks to fill the valleys, or a graphic presentation from which a root mean square averaging of the magnified peaks and valleys will give a like measure of the quality of a surface finish. However, sophisticated and expensive pieces of equipment are involved which may not be warranted in the average machine shop.

Shop analysis of a surface finish is usually by the trained eye of a machinist, with the help of specimen samples, and seldom includes more than a visual comparison or a touch-sense check by running a thumb nail across the work and the specimen sample most closely similar in appearance. Since one's visual senses may be misled by a bright and shiny surface, which may have polished high points and spaced valleys, and in turn can mislead the sensory nerves in a thumb or fingernail, this method is not dependable and more proficient shop testing means of evaluating surface finishes are needed.

SUMMARY OF THE INVENTION

The present invention relates to a surface finish analyzer particularly suited for general shop and field test use.

It includes a gauge block which is moved across the lay of a surface to be checked and has calibrated means for providing a scratch line to the prescribed depth of the valley depressions in a desired surface finish. The gauge block rides on and is piloted over the surface finish peaks. Since the scratch line is cut only to the acceptable depth of the valley depressions for a given surface finish, an intermittent scratch line indicates a surface finish of a lesser quality than desired, and an uninterrupted one evidences a finish equal to or better than that required.

DESCRIPTION OF THE DRAWINGS

FIG. 1 is a plan view of a surface finish analyzer made in accord with the teachings of this invention;

FIG. 2 is a cross-sectional side elevation view of the surface finish analyzer shown in the first drawing figure as seen in the plane of line 2-2 and looking in the direction of the arrows thereon;

FIG. 3 is an end view of the surface finish analyzer shown in the previously mentioned drawing figures;

FIG. 4 is a greatly enlarges cross-sectional fragmentary view of the functional part of the surface finish analyzer in use;

FIG. 5 is a plan view of a fragmentary part of a machine finished surface showing the scratch line test made thereof; and FIG. 6 is a perspective view of the cutting insert per se shown in FIG. 4.

DETAILED DESCRIPTION OF THE INVENTION

The surface finish analyzer 10 shown in the drawings is one of the most simple and inexpensive embodiments of the present invention and is best described as a scratch tester in serving its intended purpose of scratching a surface to test for a desired standard of finish.

A gauge block 12 is used as a holder. It includes a flat planar bottom wall surface 14 and is formed to include a handhold 16 at one end and a bore hole 18 that extends downwardly, at an angle, towards the other and of the holder and through the bottom wall surface.

In the hole 18 is disposed a cutting insert 20 which is a solid cylindrical blank or carbide or high speed steel, such as is commonly available in the trade for forming a cutting tool insert of some other shape. However, in the present instance, its blank form, with square cut ends 22 and 24, is perfect for its intended purpose.

The upper end of the holder hole 18 is threaded, as at 26, and has an adjustment screw 28 in it which bears against the blind end of the insert 20 to vary the axial position of the insert to the hole and, most particularly, the extent to which its lower disposed end extends beyond the plane of the bottom wall surface 14 of the holder.

A setscrew 30 in a threaded hole 32 that intersects the insert hole 18, serves to hold the insert 20 in its axially adjusted position and when loosened, enables the insert to be removed and replaced, turned end-for-end, or about its own axis, as desired.

The gauge block holder 12, as disposed on a machine finished surface 34, as shown in FIG. 4, and in a position to be moved across the lay of the finish, will have its planar undersurface 14 supported on the high points or peaks 36 of the finished surface and over the valley depressions 38 therebetween. The insert 20 in the holder hole 18, as axially positioned to have its lower disposed end 22 extend below the undersurface wall 14 of the holder, accordingly presents a cutting edge 40 that will scratch or score the work surface 34 and as adjusted to cut only to the depth of a desired surface finish will show whether or not that standard has been met or surpassed.

If an uninterrupted scratch line 42 is obtained, as shown in FIG. 5, then the depth of the valley depressions 38 in the finish is equal to, or less than that for the prescribed standard to which the insert 20 is initially set and the surface finish is acceptable. If, however, scratch line is intermittent, the finish is rougher than tested for, since the cutting edge 40 of the insert did not reach to the full depth of valley depressions, and is unacceptable.

Flaws and imperfections, such as scratches, across the finished surface will also be detected but the isolated interruptions in the scratch line, which they present, will be readily discerned for what they are.

Referring now to FIG. 5, it will be understood that the bottom wall surface 14 of the holder, as it rests on a machine finished surface, will span a multiplicity of valley depressions 34 and high points or peaks 36.

An intermittent variation in the test scratch, where it is uninterrupted again, in a regular pattern, will evidence a wave form in the surface finish. The ability of the tester to detect this is, of course, due to the length of the holder which enables it to span the crests of the repetitious waves.

The cutting edge 40 of the insert 20 is at a negative rake angle to the surface being scratched and the insert is backed up by the adjustment screw 28 against its blind end. Although the scratch tester may be moved in either longitudinal or lateral direction across a finished surface in serving its intended purpose, being held as it is by the setscrew 30, motion to the left as seen in FIG. 2 and 4 is recommended and preferable for accuracy and cleanness of the scratch groove.

A new cutting edge 40 is obtained on an insert by loosening the setscrew 30 and indexing it, about its own axis, turning the insert end-for-end and doing the same, and by replacing the insert with a new solid cylindrical blank when both ends are considered to have been used up.

Although not specifically shown, it will be appreciated that the adjustment screw 28 may be calibrated for microadjustments or standards of surface finish, and that other means of gaging the cutting depth of the scratch line may be used. It will also be obvious that other means for providing the scratch line may be used and that the particular form of cylindrical insert shown is not intended as a material limitation over the broad scope of the invention envisioned.

I claim:

1. The method of checking a machined surface finish, comprising; scratching the surface finish across the lay of the finish to a predetermined accurate depth equal to the maximum acceptable peak to valley depressions for a desired standard of finish, and visually inspecting the scratch line produced for interruptions indicating a surface finish of a lesser quality then the desired standard.

2. The method of claim 1, including:

piloting the scratching means transversely across the lay of the surface finish on the high points of the machine finished surface.